(12) United States Patent
Kawahara

(10) Patent No.: US 6,952,205 B2
(45) Date of Patent: Oct. 4, 2005

(54) RECORDING MEDIUM STORING 3D IMAGE PROCESSING PROGRAM, THE PROGRAM, 3D IMAGE PROCESSING METHOD AND VIDEO GAME APPARATUS

(75) Inventor: Mitsuru Kawahara, Kobe (JP)

(73) Assignee: Konami Corporation, Tokyo (JP)

( * ) Notice: Subject to any disclaimer, the term of this patent is extended or adjusted under 35 U.S.C. 154(b) by 339 days.

(21) Appl. No.: 10/216,907

(22) Filed: Aug. 12, 2002

(65) Prior Publication Data

US 2003/0038800 A1 Feb. 27, 2003

(30) Foreign Application Priority Data

Aug. 24, 2001 (JP) .............................. 2001-255082

(51) Int. Cl.[7] .................. G06T 17/00; G06T 15/40; G09G 5/00
(52) U.S. Cl. .................. 345/420; 345/421; 345/582
(58) Field of Search .................. 345/419, 420, 345/426, 581–583, 592

(56) References Cited

U.S. PATENT DOCUMENTS

| | | | |
|---|---|---|---|
| 5,357,579 A | * | 10/1994 | Buchner et al. ............ 382/100 |
| 5,638,499 A | * | 6/1997 | O'Connor et al. .......... 345/630 |
| 5,689,287 A | | 11/1997 | Mackinlay et al. |
| 5,966,132 A | * | 10/1999 | Kakizawa et al. .......... 345/419 |
| 6,142,871 A | * | 11/2000 | Inoue .......................... 463/6 |
| 6,217,445 B1 | * | 4/2001 | Inoue .......................... 463/6 |
| 6,686,915 B2 | * | 2/2004 | Andrews ..................... 345/422 |
| 6,781,592 B2 | * | 8/2004 | Murayama et al. ......... 345/585 |
| 2003/0020716 A1 | | 1/2003 | Ouchi et al. |

FOREIGN PATENT DOCUMENTS

| | | |
|---|---|---|
| EP | 0 821 986 | 2/1998 |
| JP | 2001-148032 | 5/2001 |
| JP | 2001-224847 | 8/2001 |

OTHER PUBLICATIONS

"F1 Championship Season 2000" ONLINE!, Dec. 27, 2000, pp. 1-3, XP002233611 Retrieved from the Internet: <URL: http://www.videogamereview.com/review s/Sony_Playstation/Racing/Racing-1795.asp> retrieved on Mar. 6, 2003! * p. 2, paragraph 13 *.

* cited by examiner

*Primary Examiner*—Xiao Wu
*Assistant Examiner*—M. Fatahiyar
(74) *Attorney, Agent, or Firm*—Jordan and Hamburg LLP (57) ABSTRACT

A background image generator 51 renders a first 3D model representing a landscape to generate a background image, an image generator 52 generates a second 3D model to be located between a camera viewpoint and the first 3D model, an image adhering unit 53 selects a specified range of the background image and adheres the background image within the selected range as a texture to the second 3D model, and a combined image generator 54 renders the second 3D model having the background image within the specified range adhered thereto and combines the rendered model with the background image to generate a combined image.

14 Claims, 6 Drawing Sheets

RECORDING MEDIUM STORING 3D IMAGE PROCESSING PROGRAM, THE PROGRAM, 3D IMAGE PROCESSING METHOD AND VIDEO GAME APPARATUS

The present invention relates to a three-dimensional (3D) image processing program, a recording medium which stores the 3D image processing program, method for generating 3D images, and a video game apparatus.

BACKGROUND OF THE INVENTION

1. Field of the Invention

In recent years, various game apparatuses in which characters are displayed in a simulated 3D space generated on a monitor screen have been spread. Some of such game apparatuses are known to simulate skiing, motor-booting, snow boarding, skate boarding, car race, bicycle race, etc. These sports are generally played outdoors, and weather changes such as rainfall and snowfall are presented as presentation effects conforming to actual sports in these video games.

2. Description of the Related Art

For example, in a sport relay broadcast such as a bicycle race, raindrops (water drops) may be attached to a lens of a camera during the rainfall. Even in the video games simulating the above sports, such a presentation as if water drops were attached to the camera lens catching game characters is made to give game players the better feeling of being present.

Conventionally, the water drops attached to the camera lens have been expressed by the following method. Specifically, a 3D model as a background image is rendered, and white round models having a reduced transparency are additionally rendered. A background image and water-drop images are combined in this way, thereby realizing such an expression as if water drops were attached to the camera lens.

Figure 7:
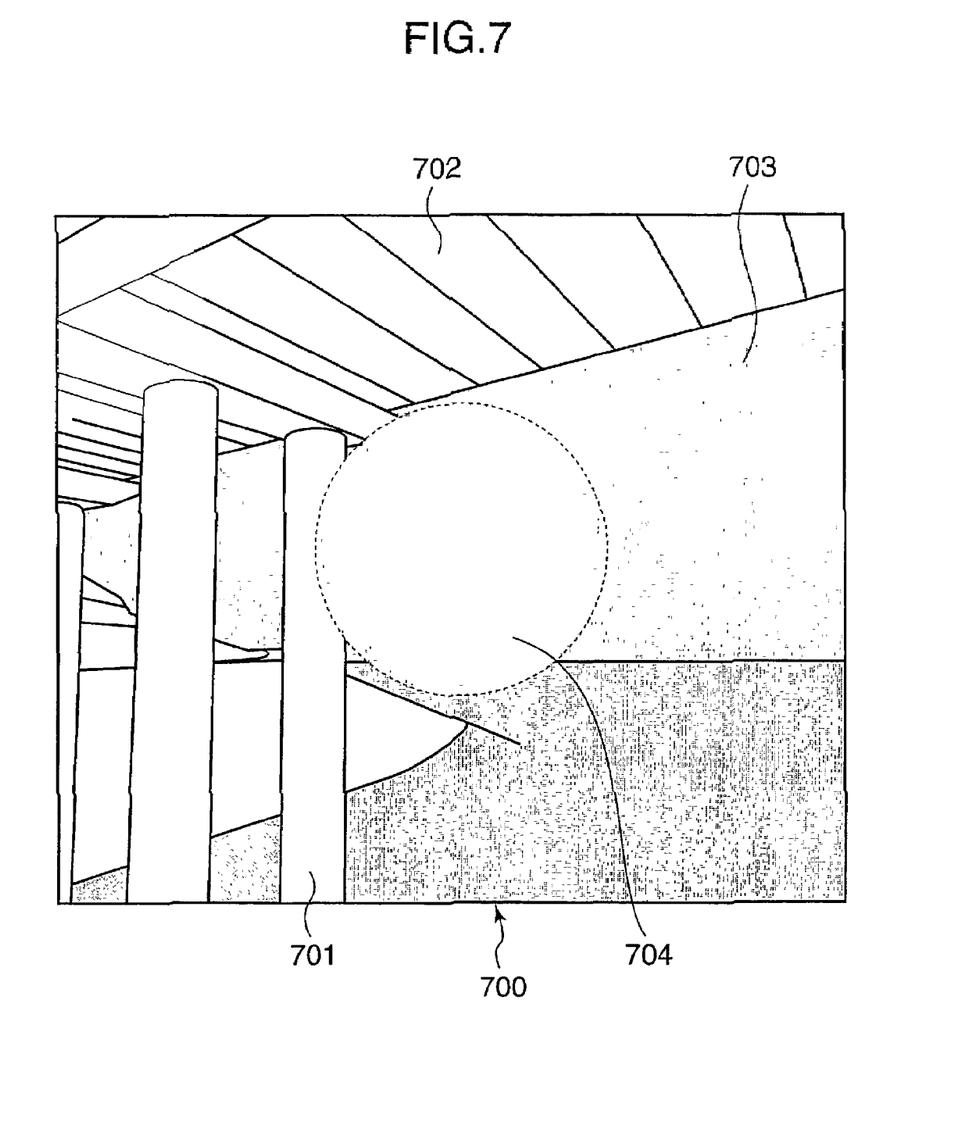
FIG. 7 is a diagram showing an example of a conventional game scene expressing a water drop attached to a camera.

FIG. 7 is a diagram showing an example of a conventional game scene expressing a water drop attached to a camera. A game scene 700 shown in FIG. 7 is a game scene in which a viewpoint of a camera is set in front of a bridge. On this game scene 700 are displayed a background image 703 comprised of 3D models of piers 701 and a girder 702, and a water-drop image 704. The pier 701, the girder 702, etc. are not displayed in this water-drop image 704 as shown in FIG. 7, and a water drop attached to the camera lens is expressed by blurring or shading the water-drop image 704 into white.

However, in the case that a water drop is actually attached to the camera lens, not only a landscape within a range of the water drop, but also a landscape within a range larger than the range of the water drop can be seen through the water drop in a distorted manner because light is refracted due to a difference in the refractive index between the water drop and the lens and according to a 3D shape of the water drop. On the other hand, an image portion of the water drop is only displayed while being blurred or shaded into white according to the conventional method, and no such display is made to let the landscape within the range wider than the range of the water drop seen through the water drop. Users find such a display lack reality.

It is possible to reflect the refracted background image on the 3D model of the water drop by simulating the refraction of light in view of the refractive indices of the water drop and the lens and the shape of the 3D model of the water drop. Such a processing is very complicated, and it is difficult to use such a processing for the presentation of the video game in view of a processing ability of the video game apparatus.

SUMMARY OF THE INVENTION

In view of the above problem, an object of the present invention is to provide 3D image processing method and apparatus and a video game apparatus capable of generating realistic 3D images conforming to actual phenomena by a simple processing.

In order to achieve the above object, according to the inventive, 3D image processing program stored in a recording medium causes the video game apparatus to function as the background image generating means for rendering the first 3D model representing the background including the landscape which changes according to the progress of the video game, characters appearing in the video game, and the like to generate the background image, the image generating means for generating the second 3D model to be located between the camera viewpoint and the first 3D model, the image adhering means for adhering the background image within the selected range as a texture to the second 3D model, and the combined image generating means for rendering the second 3D model having the background image within the specified range adhered thereto and combining the rendered model with the background image to generate the combined image.

Specifically, the video game apparatus renders the first 3D model representing the background including the landscape which changes according to the progress of the video game, the characters appearing in the video game, and the like to generate the background image; generates the second 3D model to be located between the camera viewpoint representing a virtual viewpoint provided in a 3D space in order to depict the 3D model as a 2D image and the first 3D model; and selects the specified range of the generated background image and adheres the background image within the selected range as a texture to the generated second 3D model. The second 3D model having the background image within the specified range adhered thereto is then rendered and combined with the background image to generate the combined image. This combined image is displayed on a display screen.

In this way, the second 3D model to be located between the camera viewpoint and the first 3D model is generated and the background image within the selected specified range is adhered as a texture to the generated second 3D model. Thus, the background image is displayed as if it were seen through the second 3D model, and the background image can be displayed with a natural distortion according to the selected range of the background image.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Hereinafter, a video game apparatus according to one embodiment of the present invention is described with reference to the accompanying drawings.

Figure 1:
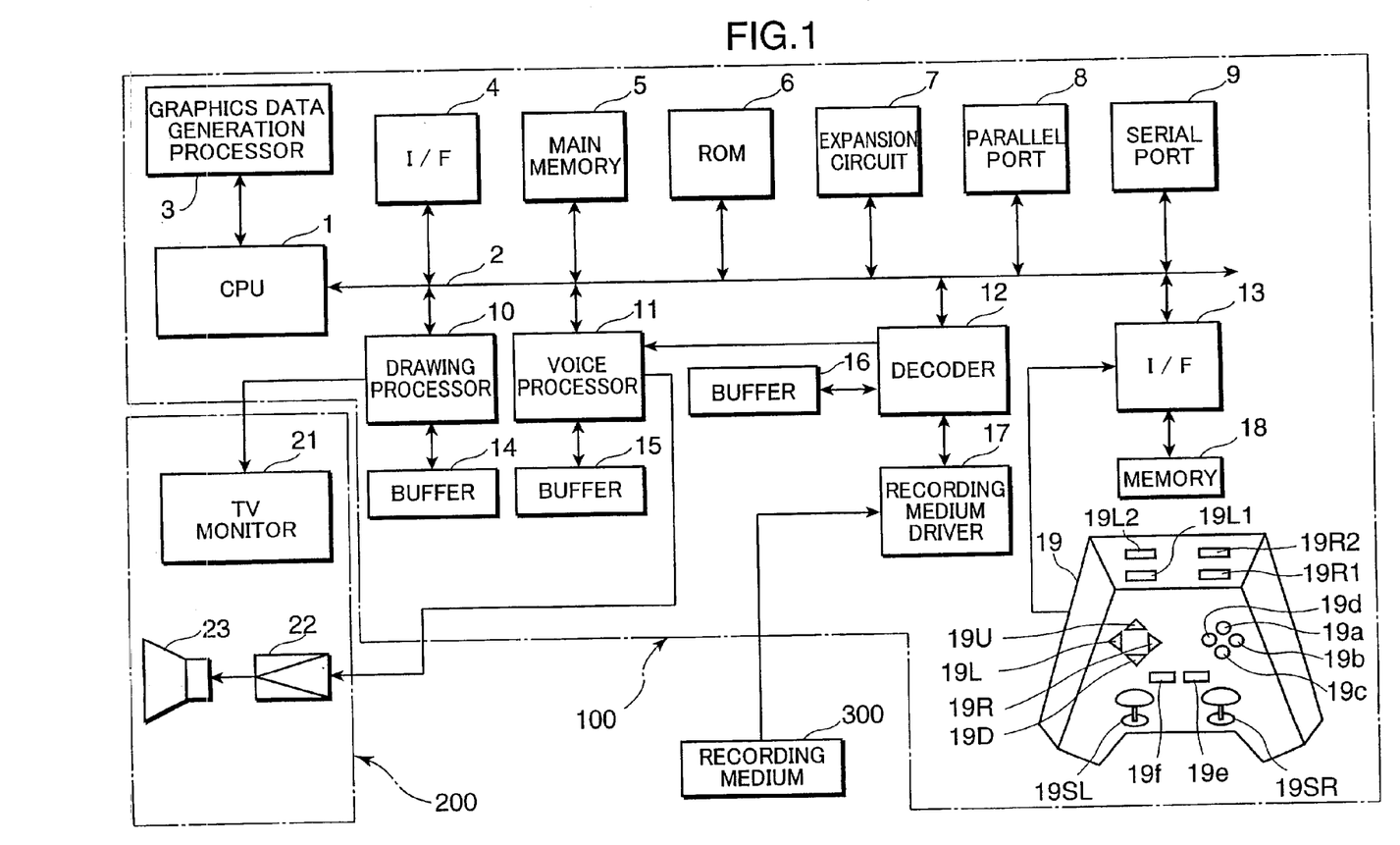
FIG. 1 is a block diagram showing a construction of a video game apparatus according to one embodiment of the present invention.

FIG. 1 is a block diagram showing a construction of a video game apparatus according to one embodiment of the present invention. In the following description, a home video game apparatus constructed by connecting a home video game device with a home television is described as an example of the video game apparatus, but the present invention is not particularly limited thereto. The present invention is similarly applicable to a video game apparatus for business use integrally formed with a monitor and a personal computer which functions as a video game apparatus by implementing a video game program.

The game apparatus is comprised of a home game device 100 and a home television 200. A computer-readable recording medium 300 in which a program data is stored is loaded in the home game device 100.

The game device 100 includes a CPU (central processing unit) 1, a bus line 2, a graphic data generating processor 3, an interface circuit (I/F) 4, a main memory 5, a ROM (read only memory) 6, an expanding circuit 7, a parallel port 8, a serial port 9, an image processor 10, a sound processor 11, a decoder 12, an interface circuit 13, buffers 14 to 16, a recording medium driver 17, a memory 18 and a controller 19. The television 200 includes a television monitor 21, an amplifying circuit 22 and a loudspeaker 23.

The CPU 1 is connected with the bus line 2 and the graphic data generating processor 3. The bus line 2 includes an address bus, a data bus, a control bus, etc. and connects the CPU 1, the interface circuit 4, the main memory 5, the ROM 6, the expanding circuit 7, the parallel port 8, the serial port 9, the image processor 10, the sound processor 11, the decoder 12 and the interface circuit 13 with each other.

The image processor 10 is connected with the buffer 14. The sound processor 11 is connected with the buffer 15 and the amplifying circuit 22. The decoder 12 is connected with the buffer 16 and the recording medium driver 17. The interface circuit 13 is connected with the memory 18 and the controller 19.

The television monitor 21 of the television 200 is connected with the image processor 10. The loudspeaker 23 is connected with the amplifying circuit 22. In the case of the video game apparatus for business use, the television monitor 21, the amplifying circuit 22 and the loudspeaker 23 may be contained in one casing together with the respective blocks forming the home game device 100.

In the case that the video game apparatus is constructed with a personal computer or a workstation as a core, the television monitor 21 and the like correspond to a computer display. The expanding circuit 7, the image processor 10, the sound processor 11, etc. correspond to part of the program data stored in the recording medium 300 or hardware on an extension board mounted on an extension slot of the computer. Further, the interface circuits 4, 13, the parallel port 8 and the serial port 9 correspond to hardware on the extension board mounted on the extension slot of the computer. Furthermore, the buffers 14 to 16 correspond to the main memory 5 or storage areas of an extension memory (not shown).

Next, the respective elements shown in FIG. 1 are described. The graphic data generating processor 3 plays a roll as a so-called co-processor of the CPU 1. Specifically, this processor 3 performs a coordinate transform and a light source calculation, e.g. calculation of fixed-point matrices and vectors by parallel processing.

Main operations performed by the processor 3 include an operation of obtaining an address of an image to be processed in a specified display area based on a coordinate data of vertices in a two-dimensional (2D) or three-dimensional (3D) space of an image data supplied from the CPU 1, a movement amount data and a rotation amount data of this image data and returning the obtained address data to the CPU 1, and an operation of calculating the luminance of an image according to a distance from a virtually set light source.

The interface circuit 4 is used as an interface for peripheral devices such as pointing devices including mousses and track balls. The main memory 5 is comprised of a RAM (random access memory), etc. A program data as an operating system of the video game apparatus is stored in the ROM 6. In personal computers, this program data corresponds to a BIOS (basic input output system).

The expanding circuit 7 expands a compressed image compressed by intra-coding in accordance with the MPEG (moving picture engineering group) for moving images and JPEG (joint picture engineering group) for still images. The expansion may be decoding (decoding of a data encoded by VLC (variable length code), dequantization, IDCT (inverse discrete cosine transform), or restoration of an intra-image.

The image processor 10 forms an image in the buffer 14 in accordance with an imaging command issued by the CPU 1 at intervals of a specified time T (e.g. one frame: T=1/60 sec.).

The buffer 14 includes, for example, a RAM and is comprised of a display area (frame buffer) and a non-display area. The display area is comprised of a development area of a data to be displayed on a display surface of the television monitor 22. The non-display area is comprised of storage areas for data defining skeletons, model data defining polygons, animation data used to animate models, pattern data representing contents of the respective animated movements, texture data and color palette data, etc.

Here, the texture data are 2D image data, and the color palette data are data for designating colors of the texture data and the like. These data are read from the CPU 1 and saved in the non-display area of the buffer 14 at once or a plurality of times in accordance with the progress of the game.

Imaging commands include those used to generate 3D images using polygons and those used to generate usual 2D images. Here, polygons are polygonal 2D virtual figures, and triangular and rectangular 2D virtual figures may, for example, be used.

The image command used to generate a 3D image using the polygons includes a polygon vertex address data representing a saved position of a polygon vertex coordinate data in the display area of the buffer 14, a texture address data representing the saved positions of the texture data to be adhered to the polygons in the buffer 14, a color palette address data representing the saved positions of a color palette data indicating the colors of the texture data in the buffer 14, and a luminance data representing the luminance of the textures.

Among these data, the polygon vertex address data in the display area is a polygon vertex coordinate data in the 2D space obtained by applying a coordinate transform to polygon vertex coordinate data in the 3D space from the CPU 1 based on a movement amount data and a rotation amount data of a screen itself by means of the graphic data generating processor 3. The luminance data is determined based on a distances between the position represented by the polygon vertex coordinate data after the coordinate transform sent from the CPU 1 and a virtually arranged light source by means of the graphic data generating processor 3.

The polygon vertex address data represents an address in the display area of the buffer 14, and the image processor 10 writes a texture data corresponding to a range of the display area of the buffer 14 defined by three polygon vertex address data.

An object such as a character in the game space is formed by a multitude of polygons. The CPU 1 stores the coordinate data of the respective polygons in the 3D space in the buffer 14 in relation to vector data of the corresponding skeletons. The following processing is performed to express movements of a character and to change a point of viewing the character, for example, in the case that the character is moved on the display surface of the television monitor 21 by operating the controller 19.

Specifically, the CPU 1 feeds the 3D coordinate data of the vertices of the respective polygons held in the non-display area of the buffer 14, and the movement amount data and the rotation amount data of the respective polygons, which were obtained from the coordinates and the rotation amount data of the skeletons, to the graphic data generating processor 3.

The graphic data generating processor 3 successively calculates the 3D coordinate data of the respective polygons after the movement and rotation based on the 3D coordinate data of the vertices of the respective polygons and the movement amount data and the rotation amount data of the respective polygons.

Among the thus obtained 3D coordinate data of the respective polygons, those in horizontal and vertical directions are fed to the image processor 10 as the address data in the display area of the buffer 21, i.e. as the polygon vertex address data.

The image processor 10 writes a texture data represented by the texture address data allotted in advance in the display area of the buffer 14 defined by three polygon vertex address data. In this way, an object formed by adhering the texture data to a multitude of polygons is displayed on the display surface of the television monitor 22.

The imaging command for generating a usual 2D image is comprised of vertex address data, texture address data, color palette address data representing stored positions of the color palette data indicating the color of the texture data in the buffer 14, and luminance data representing the luminance of the textures. Among these data, the vertex address data are obtained by applying a coordinate transform to vertex coordinate data in the 2D space from the CPU 1 based on a movement amount data and a rotation amount data from the CPU 1 by means of the graphic data generating processor 3.

The sound processor 11 writes an ADPCM (adaptive differential pulse code modulation) data read from the recording medium 300 in the buffer 15 to use the ADPCM data stored in the buffer 15 as a sound source.

Further, the sound processor 11 reads the ADPCM data based on a clock signal having a frequency of, e.g. 44.1 kHz, and applies various processings such as pitch conversion, addition of noise, envelope setting, level setting, addition of reverb to the ADPCM data read from the buffer 15.

If the sound data read from the recording medium 300 is a PCM (pulse code modulation) data such as a CD-DA (compact disk digital audio) data, the sound processor 11 converts this sound data into an ADPCM data. Further, processing of the PCM data by the program data is directly performed in the main memory 5. The PCM data processed in the main memory 5 is fed to the sound processor 11 and converted into an ADPCM data and then is outputted as a sound from the loudspeaker 23 after the aforementioned various processings are applied thereto.

The recording medium driver 17 is, for example, a CD-ROM drive, a hard disk drive, an optical disk drive, a flexible disk drive, a silicone disk drive, or a cassette medium reader. In this case, a DVD-ROM, a CD-ROM, a hard disk, an optical disk, a flexible disk, a semiconductor memory and the like can be used as the recording medium 300.

The recording medium driver 17 reads the image data, the sound data and the program data from the recording medium 300 and feeds the read data to the decoder 12. The decoder 12 applies error correction using an ECC (error correction code) to the reproduced data from the recording medium driver 17, and feeds the resulting data to the main memory 5 or the sound processor 11.

A card type memory is, for example, used as the memory 18. The card type memory is used to hold various game parameters so as to hold a state, for example, when the game is interrupted midways.

The controller 19 is an operation device used for the user to input various operation commands, and operation signals conforming to the operation made by the user are send to the CPU 1. The controller 19 is provided with a first button 19a, a left button 19b, a third button 19c, a fourth button 19d, an up-key 19U, a down-key 19D, a left-key 19L, a right-key 19R, an L1-button 19L1, an L2-button 19L2, an R1-button 19R1, an R2-button 19R2, a start button 19e, a select button 19f, a left stick 19SL and a right stick 19SR.

The up-key 19U, the down-key 19D, the left-key 19L and the right-key 19R are used to give commands to move, for example, a character or a cursor to up, down, left and right on the screen of the television monitor 21 to the CPU 1.

The start button 19e is operated to give an instruction to load the game program from the recording medium 300 to the CPU 1. The select button 19f is operated to instruct various selections concerning the game program loaded in the main memory 5 from the recording medium 300 to the CPU 1.

The respective buttons and keys of the controller 19 except the left stick 19SL and the right stick 19SR are on-off switches which are turned on from their neutral positions by a pressing force from the outside and returned to the neutral positions upon being freed from the pressing force.

The left and right sticks 19SL, 19SR are stick-shaped controllers having substantially the same construction as a so-called joystick. This stick-shaped controller has a standing stick, which can be inclined to front, back, left, right or in any direction in a 360° range about a specified point of the stick as a supporting point. According to the direction and angle of inclination, the left and right sticks 19SL, 19SR send an X-coordinate along transverse direction and a Y-coordinate along forward/backward direction in coordinate systems having the standing position of the stick as an origin as an operation signal to the CPU 1 via the interface circuit 13.

The first button 19a, the second button 19b, the third button 19c, the fourth button 19d, the L1-button 19L1, the second button 19L2, the R1-button 19R1 and the R2-button 19R2 are used for various functions in accordance with the game program loaded from the recording medium 300.

Next, the operation of this video game apparatus is summarily described. In the case that the recording medium 300 is mounted in the recording medium driver 17, when a power switch (not shown) is turned on to apply a power to the video game apparatus, the CPU 1 instructs the recording medium driver 17 to read the game program from the recording medium 300 in accordance with the operating system stored in the ROM 6. In response to this instruction, the recording medium driver 17 reads the image data, the sound data and the program data from the recording medium 300. The read image data, sound data and program data are fed to the decoder 12, where error correction is applied thereto.

The image data to which error correction was applied in the decoder 12 are fed via the bus line 2 to the expanding circuit 7, where the aforementioned expansion is applied thereto. The resulting image data are fed to the image processor 10, which in turn writes them in the non-display area of the buffer 14. The sound data to which error correction was applied in the decoder 12 are written in the buffer 15 via either the main memory 5 or the sound processor 11. The program data to which error correction was applied in the decoder 12 are written in the main memory 5.

Hereafter, the CPU 1 executes the video game in accordance with the game program data stored in the main memory 5 and contents of instructions given by the user via the controller 19. In other words, the CPU 1 suitably controls image processing, sound processing and internal processing based on the contents of instructions given by the user via the controller 19.

The control for the image processing includes, for example, calculation of the coordinates of the respective skeletons and calculation of the vertex coordinate data of the respective polygons based on a pattern data corresponding to an animation instructed for the character, feed of the obtained 3D coordinate data and a viewpoint data to the graphic data generating processor 3, and issuance of the imaging commands including the address data in the display area of the buffer 21 and the luminance data calculated by the graphic data generating processor 3.

The control for the sound processing includes, for example, issuance of sound output commands to the sound processor 11 and designation of levels, reverbs, etc. The control for the internal processing includes, for example, calculation according to the operation of the controller 19.

Next, an example of the video game played using the 3D image processing program according to the present invention is described. This video game is a bicycle race game held outdoors and a competition video game in which a self character (bicycle ridden by a player) operable by the user and opponent characters (bicycles ridden by players) operable by other users or the control of the computer compete. The user operates the controller 19 to cause the self character displayed on the television monitor 21 to make various movements to contend for ranking.

Since this bicycle race game is a game simulating a bicycle race held outdoors, such a presentation as to change the weather is made. For example, in the case of rain, raindrops (water drops) are attached to a lens of a camera filming this bicycle race. Thus, such an expression as if water drops were actually attached to this camera lens is made in this bicycle race game to make the game more realistic.

Next, main functions of the video game apparatus in the case that the bicycle race game is played using the video game apparatus constructed as above are described.

Figure 2:
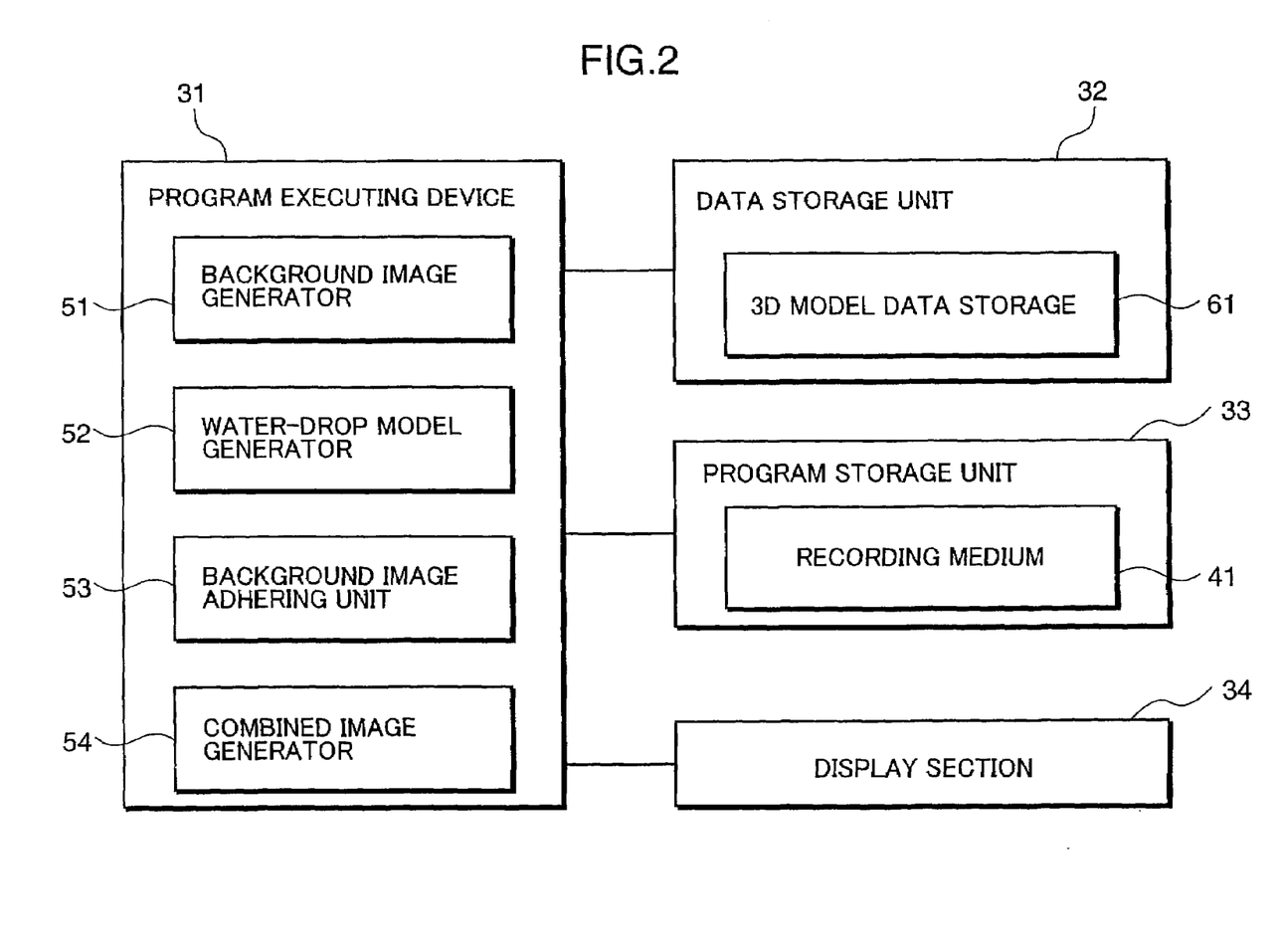
FIG. 2 is a block diagram showing main functions of the video game apparatus of FIG. 1.

FIG. 2 is a block diagram showing main functions of the video game apparatus shown in FIG. 1. As shown in FIG. 2, the video game apparatus functionally includes a program executing device 31, a data storage unit 32, a program storage unit 33 and a display section 34.

The program executing device 31 is formed by the CPU 1 and the like and functions as a background image generator 51, a water-drop model generator 52, a background image adhering unit 53, and a combined image generator 54.

The background image generator 51 generates a 2D background image by rendering a 3D background model representing a background including a landscape which changes as the video game progresses and characters and the like appearing in the video game. The 3D background models include 3D models representing the self character controlled by the user and the opponent characters as competitors and the like in addition to the 3D models representing the landscape which changes as the video game progresses.

The water-drop model generator 52 generates a 3D water-drop model to be located between a camera viewpoint representing a virtual viewpoint provided in a 3D space to depict the 3D model as a 2D image and the 3D background model on the background image generated by the background image generator 51.

This 3D water-drop model has at least a planar portion intersecting with a viewing vector from the camera viewpoint and a convex portion provided at the side of the camera viewpoint. This 3D water-drop model has such a shape obtained, for example, by cutting a solid figure such as spherical figure, an ellipsoidal figure or a gourd-shaped figure by a plane intersecting with the viewing vector from the camera viewpoint.

The background image adhering unit 53 selects a specified range of the background image including a plane, and adheres a texture obtained by reducing the background image within the selected range into the size of the 3D water-drop model to the convex portion of the 3D water-drop model.

The combined image generator 54 generates a 2D water-drop image by rendering the 3D water-drop model to which the background image within the specified range is adhered as a texture by the background image adhering unit 53, and combines it with the background image generated by the background image generator 51 to generate a combined image.

The data storage unit 32 is formed by the buffer 14 and functions as a 3D model data storage 61.

The 3D model data storage 61 stores various data on the 3D background model which becomes the background image and the 3D water-drop image which becomes the water-drop image. These various data include, for example, vertex data of the respective polygons forming the 3D model, texture data and animation data.

The program storage unit 33 is formed by the recording medium driver 17 and includes a computer-readable recording medium 41. The recording medium 41 is formed by the recording medium 300 and stores a game progress control program including the 3D image processing program as a game program. In the case that the game progress control program including the 3D image processing program is read from the recording medium 41 and stored in the main memory 5, the main memory 5 functions as the program storage unit 33.

The display section 34 is formed by the television monitor 21, etc. and displays game scenes in which the self character and the opponent characters move and game scenes generated by implementing the 3D image processing program.

In this embodiment, the 3D background model corresponds to the first 3D model, the 3D water-drop model corresponds to the second 3D model, the background image generator 51 corresponds to the background image generating means, the water-drop model generator 52 corresponds to the image generating means, the background image adhering unit 53 corresponds to the image adhering means, and the combined image generator 54 corresponds to the combined image generating means.

Figure 3:
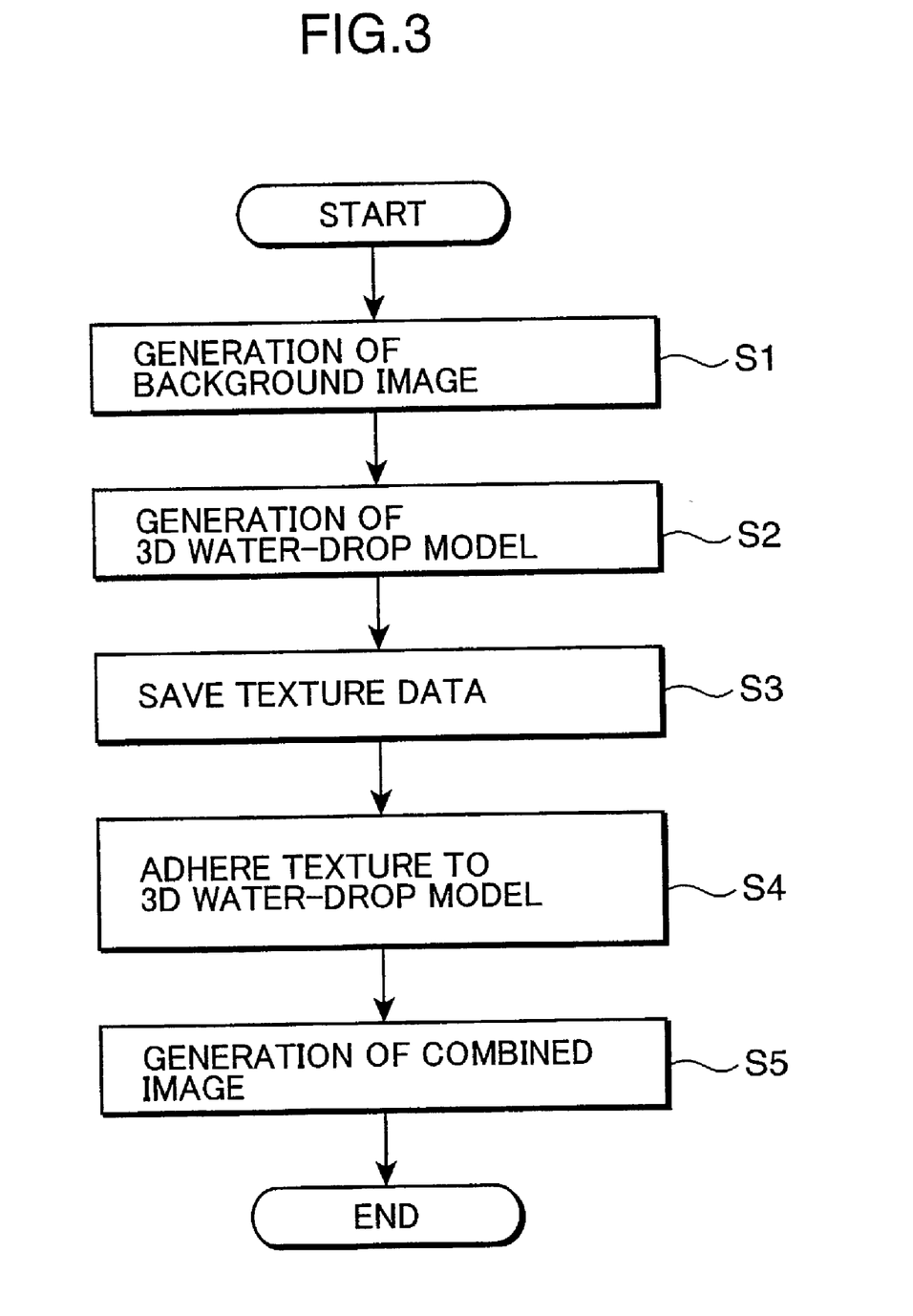
FIG. 3 is a flow chart showing an exemplary 3D image processing by the video game apparatus shown in FIG. 2.
Figure 4:
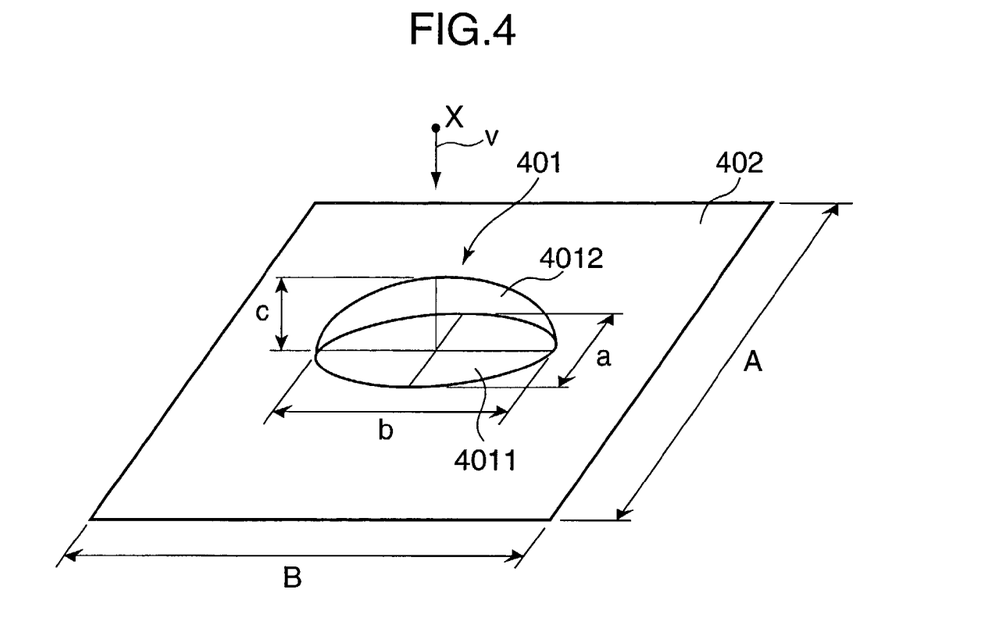
FIG. 4 is a diagram showing exemplary shape and size of a 3D water-drop model.
Figure 5:
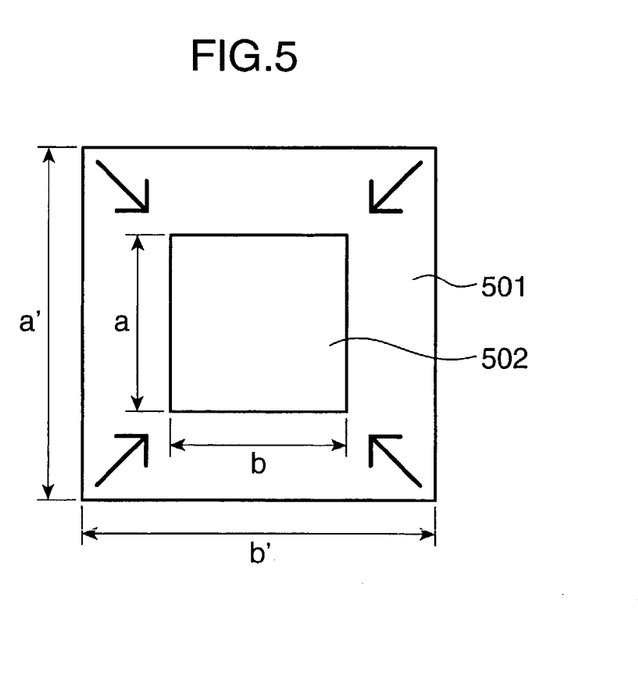
FIG. 5 is a diagram showing an exemplary range of a background image selected by a background image adhering unit and an exemplary range of a texture to be adhered to the 3D water-drop model.

FIG. 3 is a flow chart showing an exemplary 3D image processing by the video game apparatus shown in FIG. 2, FIG. 4 is a diagram showing exemplary shape and size of the 3D water-drop model, and FIG. 5 is a diagram showing an exemplary range of the background image selected by the background image adhering unit 53 and an exemplary range of a texture to be adhered to the 3D water-drop model. The 3D image processing shown in FIG. 3 is carried out by the CPU 1 and the like implementing the 3D image processing program and the like stored in the recording medium 300.

First, in Step S1, the background image generator 51 generates a background image. Specifically, various data on a 3D background image forming a landscape are read from the 3D model data storage 61 and generates a 2D background image by rendering the 3D model in the display area of the buffer 14.

Subsequently, in Step S2, the water-drop model generator 52 generates the 3D water-drop model. Specifically, various data on the 3D water-drop model expressed as a water drop attached to the camera are read from the 3D model data storage 61 and modeling is applied to the 3D water-drop model.

The generation of the 3D water-drop model in Step S2 of FIG. 3 is described with reference to a diagram of FIG. 4. A 3D water-drop model 401 includes a circular portion 4011 which is a planar portion normal to a viewing vector v from a camera viewpoint X and a convex portion 4012 having a curved surface projecting toward the camera viewpoint X. The 3D water-drop model 401 is dimensioned such that a vertical dimension "a" of the circular portion 4011 of the 3D water-drop model 401 is about 10% of a vertical dimension "A" of a display screen 402; a horizontal dimension "b" of the circular portion 4011 is about 10% of a horizontal dimension "B" of the display screen 402; and a height "c" of the convex portion 4012 of the 3D water-drop model 401 is about 1.5% of the vertical dimension "A" of the display screen 402. These numerical values are suitable values to make the image more realistic. In the case that the circular portion 4011 is right circular, a =b=2r (r is a radius of the circular portion 4011). The texture obtained by reducing the background image within the specified range in size is adhered to the curved surface of the convex portion 4011 of this 3D water-drop model 401.

It should be noted that the circular portion 4011 which is the planar portion normal to the viewing vector v from the camera viewpoint X may define a curved surface.

In this embodiment, the water-drop model generator 52 generates a plurality of 3D water-drop models and changes a ratio of an area taken up by the 3D water-drop models to the display screen. Specifically, the water-drop model generator 52 generates the 3D water-drop model 401 having various sizes by changing the vertical dimension "a" and the horizontal dimension "b" of the 3D water-drop models 401 to be generated. In this way, water-drop images having various sizes are displayed on the display screen, enabling a variety of expressions. Thus, a more realistic video game can be provided.

The shape of the circular portion 4011 which is the planar portion of the 3D water-drop model 401 is not limited to the circular shape, but may be an elliptical shape having a dimension "a" and a horizontal dimension "b" different from each other, a track shape including straight lines on its outer periphery, a gourd shape, or like substantially circular shape. Even if the 3D water-drop model has a complicated shape, the water drop can be realistically expressed by a simple processing.

Further, in this embodiment, the water-drop model generator 52 generates a plurality of 3D water-drop models and changes the number of the 3D water-drop models on the display screen. Specifically, the number of the 3D water-drop models to be generated is changed depending on, for example, the intensity of the rainfall or the intensity of the wind, whereby the intensity of the rainfall and the like can be expressed by changing the number of water-drop images displayed. For example, the number of the 3D water-drop models to be generated is reduced in the case of expressing a light rain, whereas it is increased in the case of expressing a heavy rain. This makes the video game more realistic. In this embodiment, it is preferable to restrict the number of the 3D water-drop models to be displayed to up to about 12 per scene in view of the processing speed and the realistic expression. However, the present invention is not particularly limited thereto. A suitable number of water drops can be displayed according to the video game to which the 3D image processing program is applied.

Referring back to FIG. 3, in Step S3, the background image adhering unit 53 selects a specified range of the background image generated in Step S1, i.e. a range wider than the circular portion 4011 (see FIG. 4) of the 3D water-drop model, and saves an image obtained by reducing the background image within the selected range to the size of the 3D water-drop model in the nondisplay area of the buffer 14 as a texture data.

The range of the background image and the range of the texture to be adhered to the 3D water-drop model used in Step S3 of FIG. 3 are described with reference to FIG. 5. A selection range 501 shown in FIG. 5 indicates the range of the background image to be adhered to the convex portion 4012 of the 3D water-drop model 401 as a texture on the background image. A water-drop range 502 indicates the range of the texture to be adhered to the convex portion 4012 of the 3D water-drop model 401. The background image in the selection range 501 reduced in directions of arrows becomes a texture having a size of the water-drop range 502. A vertical dimension "a'" of the selection range 501 is about 1.5 to 2.5, preferably 2 times the vertical dimension "a" of the water-drop range 502. These numerical values are suitable values to make the image more realistic. A horizontal dimension "b'" of the selection range 501 is about 1.5 to 2.5, preferably 2 times the vertical dimension "b" of the water-drop range 502. These numerical values are suitable values to make the image more realistic. The sizes of the selection range 501 and the water-drop range 502 can be set at suitable values in view of the imaging speed and the realistic display. Further, water drops having different refractive indices are expressed by changing the size of the selection range 501.

The shape of the selection range 501 and the water-drop range 502 shown in FIG. 5 may be circular.

Referring back to FIG. 3, in Step S4, the background image adhering unit 53 adheres the texture saved as a texture data in Step S3 to the 3D water-drop model modeled in Step S2.

Since the background is sometimes seen vertically and transversely inverted through an actual water drop by the refraction of light, the background image adhering unit 53 adheres the background image within the selected range reduced to the size of the 3D water-drop model to the convex portion of the 3D water-drop model as a texture after vertically and transversely inverting it, for example, in the case that the size (vertical and horizontal dimensions "a", "b") of the 3D water-drop model is larger than a specified size or in the case that a distance between the 3D background model and the camera viewpoint is longer than a specified distance. In this way, the refraction of light which transforms a real image into an vertically and transversely inverted image can be expressed, thereby making the video game even more realistic.

Although the background image within the selected range is vertically and transversely inverted in this embodiment, the present invention is not particularly limited thereto and the background image may be only vertically or transversely inverted. In other words, depending on the background image, the same effects as in the case that the background image is vertically and transversely inverted can be obtained only by vertically or transversely inverting it.

In Step S5, the combined image generator 54 renders the 3D water-drop model having the background image within the specified range adhered thereto in Step S4 in the display area of the buffer 14 to combine the rendered water-drop image with the background image generated in Step S1, and displays the combined image on the television monitor 21.

By repeating the operations of Steps S2 to S5, a water drop image through which the background is seen in a distorted manner is displayed on the display screen of the television monitor 21.

Since the background image within the selected specified range is adhered as a texture to the generated 3D water-drop model, the background within the specified range is displayed through the 3D water-drop model and is distorted in a natural manner depending on the selected range of the background image. Thus, a video game made realistic by a simple processing can be provided.

Figure 6:
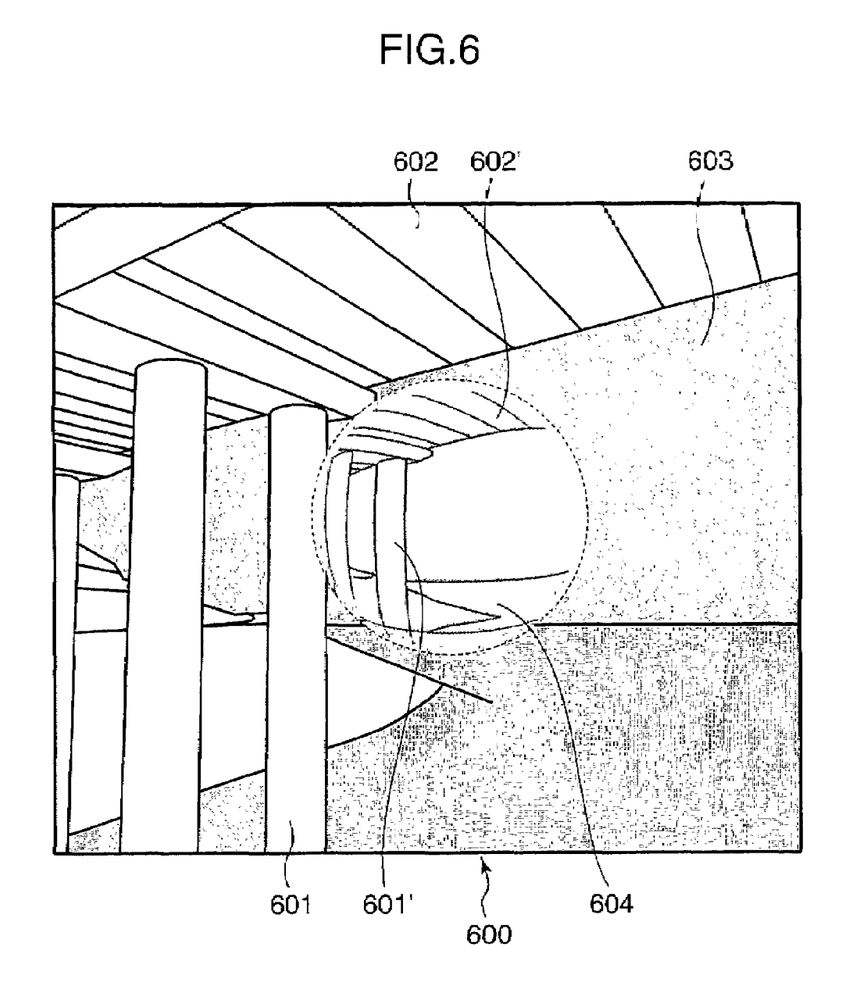
FIG. 6 is a diagram showing an example of a game scene expressing a water drop attached to a camera by the 3D image processing.

FIG. 6 is a diagram showing an exemplary game scene expressing a water drop attached to the camera by the 3D image processing. Similar to FIG. 7, FIG. 6 shows a game scene 600 in which the camera viewpoint is set before a bridge. On the game scene 600 is displayed a background image 603 including piers 601 and a girder 602, and a water-drop image 604. As shown in FIG. 6, the piers 601 and the girder 602 are displayed as piers 601' and a girder 602' in the water-drop image 604. In other words, the background image within a range larger than the water-drop image 604 is displayed in the water-drop image 604 in a distorted manner, realizing a realistic expression.

Although the expression of the water drops attached to the camera in the bicycle race game is described in the foregoing embodiment, the present invention is not particularly limited thereto and may be applied to other race games or sport games simulating sport competitions held outdoors or further applied to, for example, the expression of water drops attached to a windowpane.

Although the 3D water-drop model has at least the convex portion at the side of the camera viewpoint in the foregoing embodiment, the present invention is not particularly limited thereto. The 3D water-drop model may have at least a convex portion at the side opposite from the camera viewpoint.

Although the second 3D model is described as the 3D water-drop model representing a water drop which is a raindrop in the foregoing embodiment, the present invention is not particularly limited thereto. The second 3D model may be a 3D liquid-drop model representing a liquid drop. For example, in the case that the liquid drop is an oil drop (drop of an oil), the selection range 501 (see FIG. 5) selected to be adhered as a texture is enlarged since water and oil have different refractive indices, and the enlarged selection range 501 is adhered to the 3D model representing the oil drop. In other words, the liquid drop which changes depending on the refractive index can be expressed by changing the range selected to be adhered as a texture. Liquids mentioned here are preferably water, oils and those having a light-transmitting property. Further, the second 3D model in the present invention is not limited to the water drop or the liquid drop such as an oil drop, and may be a gelatinous material having a light-transmitting property.

The degree of deformation of the water drop to be displayed can be changed by changing the value of the height "c" (see FIG. 4) of the 3D water-drop model. In other words, the degree of deformation of the water drop to be displayed becomes larger by increasing the value of the height "c" of the 3D water-drop model while becoming smaller by decreasing it. In this way, a variety of expressions can be made.

The expression of the liquid drop becomes more realistic by filtering the texture of the background image selected by the background image adhering unit 53 by a color filter (yellow filter in the case of an oil drop) corresponding to the kind of the liquid drop.

Although the second 3D model is described as a convex 3D model in the foregoing embodiment, the present invention is not particularly limited thereto. The second 3D model may be a concave 3D model.

The 3D water-drop model can be moved in the foregoing embodiment. Specifically, the 3D water-drop model is moved by giving a specified motion parameter to the 3D water-drop model, thereby making such a display as if a water drop were actually trickling. This motion parameter includes, for example, a speed and a direction of moving the 3D water-drop model. Then, the water drop can be expressed as if it were trickling down, in a direction opposite from a camera turning direction, in a wind-blowing direction, or in a direction from the center of the scene toward an outer side in the case that the camera is advancing, thereby making the video game even more realistic. Further, the speed of moving the 3D model is changed according to the kind of the liquid drop. Specifically, in the case of expressing an oil drop, a more realistic expression can be realized by making the moving speed of the 3D oil-drop model slower than that of the 3D water-drop model.

Although the size of the water-drop image to be displayed is changed by changing the vertical dimension "a" and the horizontal dimension "b" (see FIG. 4) of the 3D water-drop model in this embodiment, the present invention is not particularly limited thereto. The size of the water-drop image to be displayed may be changed by changing the position where the 3D water-drop model is located. In other words, the closer the 3D water-drop model is to the camera viewpoint, the larger the water drop is displayed. Conversely, the more distant the 3D water-drop model is to the camera viewpoint, the smaller the water drop is displayed.

The texture to be adhered to the second 3D model may be blurred or shaded in the foregoing embodiment. This realizes an even more realistic expression, for example, in the case that the water drop is not in focus.

In summary, according to the recording medium which stores a 3D image processing program, 3D image processing program, 3D image processing method and video game apparatus, the video game apparatus functions as the background image generating means for rendering the first 3D model representing the background including the landscape which changes according to the progress of the video game, characters appearing in the video game, and the like to generate the background image, the image generating means for generating the second 3D model to be located between the camera viewpoint and the first 3D model, the image adhering means for adhering the background image within the selected range as a texture to the second 3D model, and the combined image generating means for rendering the second 3D model having the background image within the specified range adhered thereto and combining the rendered model with the background image to generate the combined image.

Specifically, the video game apparatus renders the first 3D model representing the background including the landscape which changes according to the progress of the video game, the characters appearing in the video game, and the like to generate the background image; generates the second 3D model to be located between the camera viewpoint representing a virtual viewpoint provided in a 3D space in order to depict the 3D model as a 2D image and the first 3D model; and selects the specified range of the generated background image and adheres the background image within the selected range as a texture to the generated second 3D model. The second 3D model having the background image within the specified range adhered thereto is then rendered and combined with the background image to generate the combined image. This combined image is displayed on a display screen.

In this way, the second 3D model to be located between the camera viewpoint and the first 3D model is generated and the background image within the selected specified range is adhered as a texture to the generated second 3D model. Thus, the background image is displayed as if it were seen through the second 3D model, and the background image can be displayed with a natural distortion according to the selected range of the background image. According to the present invention with the aforementioned features, the background image is displayed as if it were seen through the second 3D model, and the background image is displayed with a natural distortion according to the selected range of the background image. Thus, the 3D image representing a water drop or the like through which the background is seen can be displayed in a distorted manner by a simple processing. Thus, realistic video games conforming to real phenomena can be provided.

In the aforementioned invention, the second 3D model may include at least a convex portion, and the image adhering means adheres the background image within the selected range as a texture to the convex portion after reducing it in size. Since the texture obtained by reducing the background image within the selected range in size is adhered to the second 3D model having at least the convex portion, the background image within a larger range than the second 3D model is displayed on the display screen and expressed as if it were seen through the second 3D model in a distorted manner. Further, the background image within the range wider than the second 3D model is reflected on the second 3D model and is expressed in a distorted manner on the display screen as if it were seen through the second 3D model, whereby the refraction of light can be fairly realistically expressed. Thus, realistic video games conforming to real phenomena can be provided.

In addition, the image adhering means can be set to adhere an inverted image obtained by inverting the background image within the selected range as a texture to the second 3D model. Since the inverted image obtained by inverting the background image within the selected range is adhered as a texture to the second 3D model, the refraction of light can be expressed by a vertically inverted image, a transversely inverted image or a vertically and transversely inverted image obtained by vertically and/or transversely inverting the background image to be adhered as a texture to the second 3D model. Further, the refraction of light can be expressed by the vertically inverted image, the transversely inverted image or the vertically and transversely inverted image obtained by vertically and/or transversely inverting the background image to be adhered as a texture to the second 3D model. Thus, realistic video games conforming to real phenomena can be provided.

Moreover, in the aforementioned invention, the image generating means can generate a plurality of second 3D images and changes a ratio of an area taken up by the respective second 3D images to a display screen.

In the case that a plurality of second 3D models are displayed, for example, in the case that the second 3D models are 3D models representing water drops such as raindrops, a plurality of water drops having various sizes can be displayed, enabling a more realistic expression. Thus, realistic video games conforming to real phenomena can be provided.

Furthermore, in the above described invention, the image generating means changes the height of the convex portion. The size of the second 3D model can be changed. For example, if the second 3D model is a 3D model representing a water drop such as a raindrop, a degree of deformation of the background image can be changed by changing the height of the water drop, enabling a variety of expressions.

Thus, realistic video games more conforming to real phenomena can be provided.

This application is based on Japanese Patent Application Serial No. 2001-255082 filed in Japan Patent Office on Aug. 24, 2001, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A recording medium which stores a 3D image processing program for processing a 3D image, said program causes a video game apparatus to function as:

background image generating means for rendering a first 3D model representing a landscape to generate a background image, image generating means for generating a second 3D model to be located between a camera viewpoint and the first 3D model, image adhering means for selecting a specified range of the background image, the range including at least part of an image behind the second 3D model with respect to a view from the camera viewpoint, and adhering the background image within a selected range as a texture to the second 3D model, and combined image generating means for rendering the second 3D model having the background image within the specified range adhered thereto and combining the rendered model with the background image to generate a combined image.

2. A recording medium according to claim 1, wherein the second 3D model includes at least a convex portion, and the image adhering means adheres the background image within the selected range as a texture to the convex portion after reducing it in size.

3. A recording medium according to claim 1, wherein the image adhering means adheres an inverted image obtained by inverting the background image within the selected range as a texture to the second 3D model.

4. A recording medium according to claim 1, wherein the image generating means generates a plurality of second 3D images and changes a ratio of an area taken up by the respective second 3D images to a display screen.

5. A recording medium according to claim 2, wherein the image generating means changes the height of the convex portion.

6. A 3D image processing method processing a 3D image, the method comprising the steps of:
    background image generating step in which a video game apparatus renders a first 3D model representing a landscape to generate a background image,
    image generating step in which the video game apparatus generates a second 3D model to be located between a camera viewpoint and the first 3D model,
    image adhering step in which the video game apparatus selects a specified range of the background image, the range including at least part of an image behind the second 3D model with respect to a view from the camera viewpoint, and adheres the background image within the selected range as a texture to the second 3D model, and
    combined image generating step in which the video game apparatus renders the second 3D model having the background image within the specified range adhered thereto and combines the rendered model with the background image to generate a combined image.

7. A video game apparatus for processing a 3D image, comprising:
    background image generating means for rendering a first 3D model representing a landscape to generate a background image,
    image generating means for generating a second 3D model to be located between a camera viewpoint and the first 3D model,
    image adhering means for selecting a specified range of the background image, the range including at least part of an image behind the second 3D model with respect to a view from the camera viewpoint, and adhering the background image within the selected range as a texture to the second 3D model, and
    combined image generating means for rendering the second 3D model having the background image within the specified range adhered thereto and combining the rendered model with the background image to generate a combined image.

8. A 3D image processing program for processing a 3D image, characterized by causing a video game apparatus to function as:
    background image generating means for rendering a first 3D model representing a landscape to generate a background image,
    image generating means for generating a second 3D model to be located between a camera viewpoint and the first 3D model,
    image adhering means for selecting a specified range of the background image, the range including at least part of an image behind the second 3D model with respect to a view from the camera viewpoint, and adhering the background image within the selected range as a texture to the second 3D model, and
    combined image generating means for rendering the second 3D model having the background image within the specified range adhered thereto and combining the rendered model with the background image to generate a combined image.

9. The recording medium of claim 1 wherein the range of the background image selected by said image adhering means includes at least part of the background image behind the second 3D model, normal to a view vector of the camera viewpoint.

10. The 3D image processing method of claim 6 wherein the range of the background image selected by said image adhering step includes at least part of the background image behind the second 3D model, normal to a view vector of the camera viewpoint.

11. The video game apparatus of claim 7 wherein the range of the background image selected by said image adhering means includes at least part of the background image behind the second 3D model, normal to a view vector of the camera viewpoint.

12. The 3D image processing program of claim 8 wherein the range of the background image selected by said image adhering means includes at least part of the background image behind the second 3D model, normal to a view vector of the camera viewpoint.

13. A recording medium which stores a 3D image processing program for processing a 3D image, said program causes a video game apparatus to function as:
    background image generating means for rendering a first 3D model representing a landscape to generate a background image,
    image generating means for generating a second 3D model to be located between a camera viewpoint and the first 3D model,
    image adhering means for selecting a specified range of the background image and adhering the background image within a selected range as a texture to the second 3D model;
    combined image generating means for rendering the second 3D model having the background image within the specified range adhered thereto and combining the rendered model with the background image to generate a combined image; and
    the second 3D model including at least a convex portion, and the image adhering means adhering the background image within the selected range as a texture to the convex portion after reducing it in size.

14. A recording medium according to claim 9, wherein the image generating means changes the height of the convex portion.

* * * * *